US012591456B2

(12) United States Patent
Kim

(10) Patent No.: US 12,591,456 B2
(45) Date of Patent: Mar. 31, 2026

(54) METHOD AND APPARATUS FOR CONTROLLING HARDWARE ACCELERATOR

(71) Applicant: MOBILINT INC., Seoul (KR)

(72) Inventor: Jisung Kim, Seoul (KR)

(73) Assignee: MOBILINT INC., Seoul (KR)

( * ) Notice: Subject to any disclaimer, the term of this patent is extended or adjusted under 35 U.S.C. 154(b) by 412 days.

(21) Appl. No.: 18/336,639

(22) Filed: Jun. 16, 2023

(65) Prior Publication Data

US 2023/0333889 A1      Oct. 19, 2023

Related U.S. Application Data

(63) Continuation of application No. PCT/KR2020/018800, filed on Dec. 21, 2020.

(30) Foreign Application Priority Data

Dec. 21, 2020    (KR) ........................ 10-2020-0179440

(51) Int. Cl.
    *G06F 9/48*          (2006.01)
    *G06F 9/38*          (2018.01)
(52) U.S. Cl.
    CPC .......... *G06F 9/4881* (2013.01); *G06F 9/3877* (2013.01)
(58) Field of Classification Search
    None
    See application file for complete search history.

(56) References Cited

U.S. PATENT DOCUMENTS

| | | | |
|---|---|---|---|
| 9,870,255 B2 | 1/2018 | Hou et al. | |
| 9,870,256 B2 | 1/2018 | Hou et al. | |
| 10,255,181 B2 | 4/2019 | Turner et al. | |
| 10,310,897 B2 | 6/2019 | Drysdale et al. | |
| 10,390,114 B2 * | 8/2019 | Schmisseur | G06F 3/0653 |
| 10,558,490 B2 * | 2/2020 | Ronen | G06F 9/3851 |

(Continued)

FOREIGN PATENT DOCUMENTS

| | | |
|---|---|---|
| KR | 10-2016-0050003 A | 5/2016 |
| KR | 10-2019-0050988 A | 5/2019 |
| WO | 2020/234792 A1 | 11/2020 |

OTHER PUBLICATIONS

Pohl et al. "Resource Management for the Heterogeneous Arrays of Hardware Accelerators", 2011 IEEE, pp. 486-489.*

(Continued)

*Primary Examiner* — Van H Nguyen
(74) *Attorney, Agent, or Firm* — Studebaker Brackett PLLC

(57) ABSTRACT

Disclosed are a method and apparatus for controlling a hardware accelerator. The method includes setting a delay time related to task performance of a specific hardware accelerator, switching to a sleep state during the set delay time from a request time point when making a request, to a central processing unit (CPU), for requesting the specific hardware accelerator to accelerate a task, polling the state of the specific hardware accelerator to the CPU by switching from the sleep state to an operating state after the delay time, not polling a state of the specific hardware accelerator to the CPU during the delay time when switching to the sleep state, and receiving result information corresponding to the polling from the CPU in response to the polling.

8 Claims, 6 Drawing Sheets

(56) References Cited

U.S. PATENT DOCUMENTS

| 10,768,842 | B2 * | 9/2020 | Mitchel | G06F 21/70 |
|---|---|---|---|---|
| 10,928,847 | B2 * | 2/2021 | Suresh | G06F 21/64 |
| 2013/0031553 | A1 | 1/2013 | Hou et al. | |
| 2013/0031554 | A1 | 1/2013 | Hou et al. | |
| 2016/0117199 | A1 | 4/2016 | Sundaram | |
| 2018/0081804 | A1 | 3/2018 | Turner et al. | |
| 2018/0095750 | A1 | 4/2018 | Drysdale et al. | |
| 2019/0258251 | A1 * | 8/2019 | Ditty | G06F 15/7807 |

OTHER PUBLICATIONS

Chen et al. "Execution Time Prediction for Energy-Efficient Hardware Accelerators", 2015 IEEE, 13 pages.*
International Search Report issued in PCT/KR2020/018800; mailed Sep. 6, 2021.

* cited by examiner

METHOD AND APPARATUS FOR CONTROLLING HARDWARE ACCELERATOR

CROSS-REFERENCE TO RELATED APPLICATIONS

The present application is a continuation of International Patent Application No. PCT/KR2020/018800, filed on Dec. 21, 2020, which is based upon and claims the benefit of priority to Korean Patent Application No. 10-2020-0179440 filed on Dec. 21, 2020. The disclosures of the above-listed applications are hereby incorporated by reference herein in their entirety.

BACKGROUND

Embodiments of the inventive concept described herein relate to a method and apparatus for controlling a hardware accelerator.

A hardware accelerator refers to a hardware device capable of performing some computing functions faster than a central processing unit (CPU). As such, the hardware accelerator may be used to help process a workload.

A host CPU performs process management by controlling operations of these hardware accelerators. Generally, the host CPU may continuously monitor a state register of a hardware accelerator core. When a state change is detected, the host CPU may perform an accelerator manipulation such as uploading data for the next operation. To this end, the host CPU may quickly and simply check the current state of the accelerator by using a polling method. In this case, the host CPU is based on an environment capable of multitasking. Accordingly, the host CPU may perform multiple tasks (e.g., pre/post processing, other system tasks, etc.) at the same time.

However, this polling method consumes CPU cycles and affects CPU operation speed, such as pre/post processing or the performance of other running programs, thereby degrading the performance of the entire system.

SUMMARY

Embodiments of the inventive concept provide a method and apparatus for controlling a hardware accelerator capable of minimizing an unnecessary polling operation.

Problems to be solved by the inventive concept are not limited to the problems mentioned above, and other problems not mentioned will be clearly understood by those skilled in the art from the following description.

According to an embodiment, a hardware accelerator controlling method includes setting a delay time related to task performance of a specific hardware accelerator, switching to a sleep state during the set delay time from a request time point when making a request, to a central processing unit (CPU), for requesting the specific hardware accelerator to accelerate a task, polling the state of the specific hardware accelerator to the CPU by switching from the sleep state to an operating state after the delay time, not polling a state of the specific hardware accelerator to the CPU during the delay time when switching to the sleep state, and receiving result information corresponding to the polling from the CPU in response to the polling.

In an embodiment of the inventive concept, the setting of the delay time may include receiving a setting initialization request of the specific hardware accelerator from a system job using the specific hardware accelerator, determining the delay time related to the task performance of the specific hardware accelerator in response to the setting initialization request, and providing the system job with a setting initialization completion message of the specific hardware accelerator.

For example, when the setting initialization request of the specific hardware accelerator is used to request an automatic setting of the delay time, the setting of the delay time may further include making a request, to the CPU, requesting the specific hardware accelerator to accelerate a task for measuring the delay time, and after a specific period, polling the state of the specific hardware accelerator to the CPU and receiving result information for measurement in response to the polling. In this case, the delay time associated with the task performance of the specific hardware accelerator may be determined by using the received result information for measurement.

For another example, when the setting initialization request of the specific hardware accelerator is used to request a manual setting of the delay time, the delay time associated with the task performance of a specific hardware accelerator may be determined by using at least one of input information input from a user or minimum delay time information set for the hardware accelerator.

In an embodiment of the inventive concept, the specific hardware accelerator may include a GPU. The task performance of the specific hardware accelerator may include implementation of a deep learning algorithm.

According to an embodiment, a hardware accelerator controlling apparatus includes a delay time setting unit that sets a delay time related to task performance of a specific hardware accelerator, a sleep state switching unit that switches to a sleep state during the set delay time from a request time point when making a request, to a CPU, for requesting the specific hardware accelerator to accelerate a task, a polling unit that does not poll a state of the specific hardware accelerator to the CPU during the delay time when switching to the sleep state, and polls the state of the specific hardware accelerator to the CPU by switching from the sleep state to an operating state after the delay time, and a result information receiving unit that receives result information corresponding to the polling from the CPU in response to the polling.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
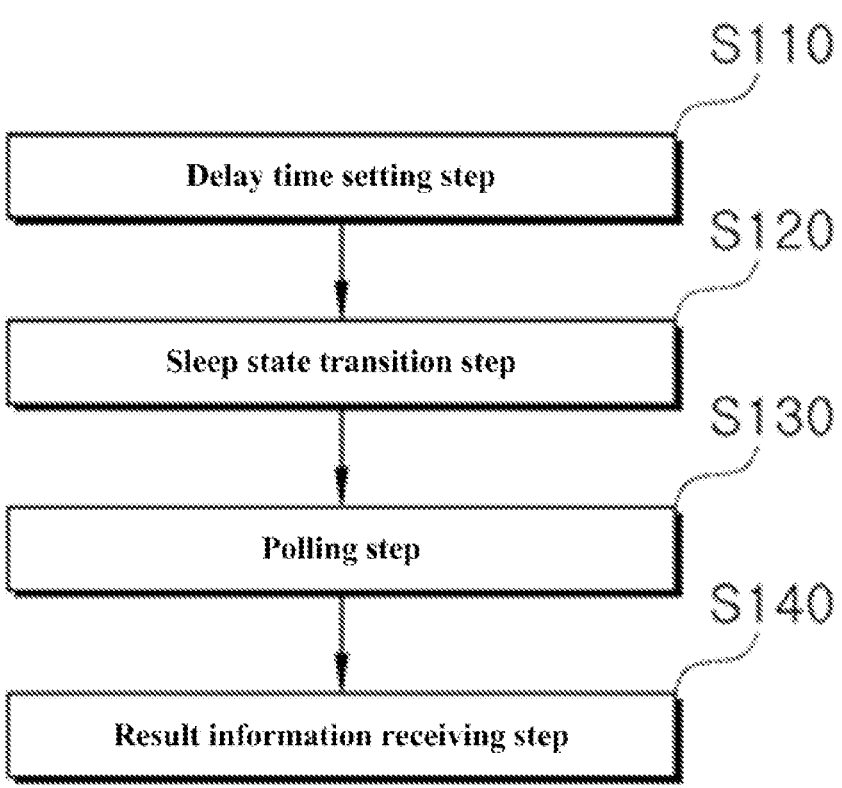
FIG. 1 is a diagram illustrating a hardware accelerator controlling method, according to an embodiment of the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the inventive concept will be described in detail with reference to accompanying drawings.

FIG. 1 is a diagram illustrating a hardware accelerator controlling method, according to an embodiment of the inventive concept.

As illustrated in FIG. 1, a hardware accelerator controlling method may include step S110 of setting a delay time (or an operation time, for convenience of description, hereinafter collectively referred to as a "delay time") related to task performance of a specific hardware accelerator, step S120 of switching to a sleep state during the set delay time from a request time point when requesting, from a CPU, requesting the specific hardware accelerator to accelerate a task, step S130 of switching from the sleep state to an operating state after the delay time and polling the state of the specific hardware accelerator to the CPU, and step S140 of receiving result information corresponding to the polling from the CPU in response to the polling.

In an embodiment of the inventive concept, it is assumed that the above-described hardware accelerator controlling method is performed by a hardware accelerator controlling apparatus. In this case, the hardware accelerator controlling apparatus may include a virtual application device capable of being implemented in a multitasking environment, such as a software framework or an operating system (OS).

Hereinafter, a hardware accelerator controlling method applicable to the inventive concept will be described in detail according to the detailed embodiment shown in FIG. 2.

Figure 2:
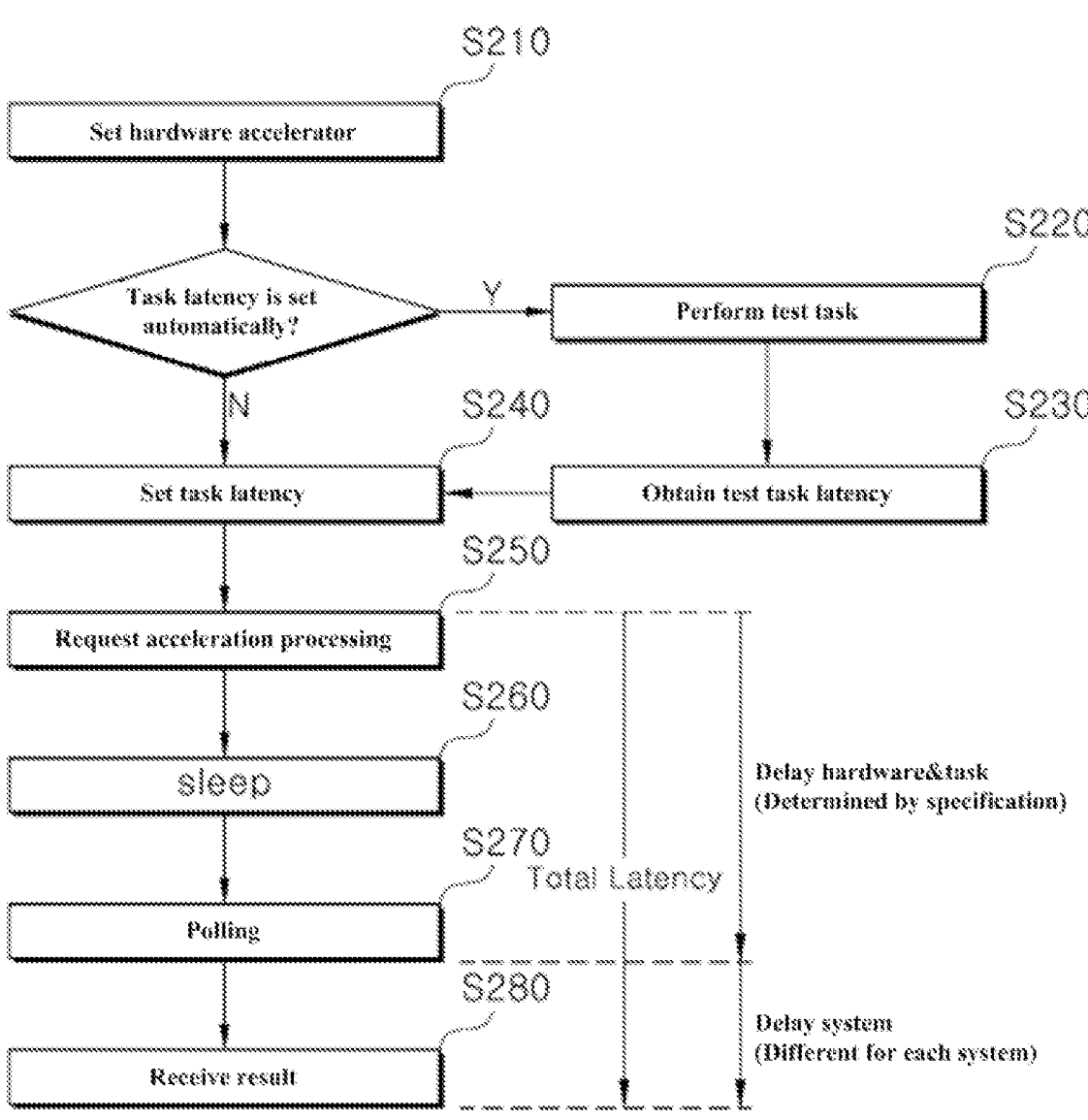
FIG. 2 is a diagram showing a hardware accelerator controlling method, according to an embodiment of the inventive concept.

FIG. 2 is a diagram showing a hardware accelerator controlling method, according to an embodiment of the inventive concept.

First of all, a hardware accelerator controlling apparatus may set a hardware accelerator (S210). When a specific system job desires to use a specific hardware accelerator, the hardware accelerator controlling apparatus may set the specific hardware accelerator for the specific system job. In this case, the job may mean a small work unit that performs a specific single task.

In step S210, the hardware accelerator controlling apparatus may receive a setting initialization request message of the specific hardware accelerator from the specific system job.

In an embodiment of the inventive concept, the setting initialization request message may be used to request automatic setting of a delay time related to a specific hardware accelerator, or may be used to request manual setting of delay time related to the specific hardware accelerator.

For example, when the setting initialization request message is used to request the automatic setting of the delay time associated with the specific hardware accelerator, the hardware accelerator controlling apparatus according to an embodiment of the inventive concept may make a request, to a (host) CPU, for requesting the specific hardware accelerator to accelerate a task for measuring the delay time (S220). Then, after a specific period, the hardware accelerator controlling apparatus may poll a state of the specific hardware accelerator to the CPU and may receive result information for measurement in response to the polling. In this way, the hardware accelerator controlling apparatus may determine the delay time associated with the task performance of the specific hardware accelerator by using the received result information for measurement (S230). Subsequently, the hardware accelerator controlling apparatus may set the determined delay time as a delay time related to task performance of the specific hardware accelerator (S240).

For another example, when the setting initialization request message is used to request the manual setting of the delay time associated with the specific hardware accelerator, the hardware accelerator controlling apparatus according to an embodiment of the inventive concept may determine the delay time associated with the task performance of the specific hardware accelerator. For example, the hardware accelerator controlling apparatus may determine the delay time associated with the task performance of a specific hardware accelerator by using at least one or more of input information input from a user or minimum delay time information set for the hardware accelerator.

When settings for the specific hardware accelerator are initialized through the above-described process, the hardware accelerator controlling apparatus according to an embodiment of the inventive concept may provide a setting initialization completion message of the specific hardware accelerator to a system job that has transmitted a setting initialization request.

Next, the hardware accelerator controlling apparatus may receive a task request from the above-described system job. When the task request is received, the hardware accelerator controlling apparatus may a make a request, to the (host) CPU, for requesting the specific hardware accelerator associated with the system job to accelerate a task (S250). At this time, during the delay time set in step S240 from a request time point, the hardware accelerator controlling apparatus may switch to a sleep state (S260). In other words, the hardware accelerator controlling apparatus may minimize an unnecessary polling operation during the delay time by switching to the sleep state during the set delay time.

The hardware accelerator controlling apparatus may poll the state of the specific hardware accelerator to the CPU by switching from the sleep state to an operating state after the above-described delay time (S270). Next, the hardware accelerator controlling apparatus may receive result information corresponding to the polling from the CPU in response to the polling (S280).

As such, the hardware accelerator controlling apparatus according to an embodiment of the inventive concept may perform a polling operation after the specific hardware accelerator sleeps and wakes up during a time required to process a specific task. In this way, among the total delay time (total latency), a hardware&task delay time is determined in advance (e.g., determined by the specification), and thus the hardware accelerator controlling apparatus may sleep during the hardware&task delay time. Next, while the hardware accelerator controlling apparatus performs polling and receives the corresponding result, a system delay time (e.g., different for each system) may occur. Unlike the latency of a specific hardware accelerator, it is difficult to predict a time required for the entire system in an environment (e.g., OS) capable of multitasking. Accordingly, the hardware accelerator controlling apparatus may perform polling during the corresponding system delay time, may detect the state of the specific hardware accelerator as quickly as possible, and may obtain the result of accelerator operation processing.

Figure 3:
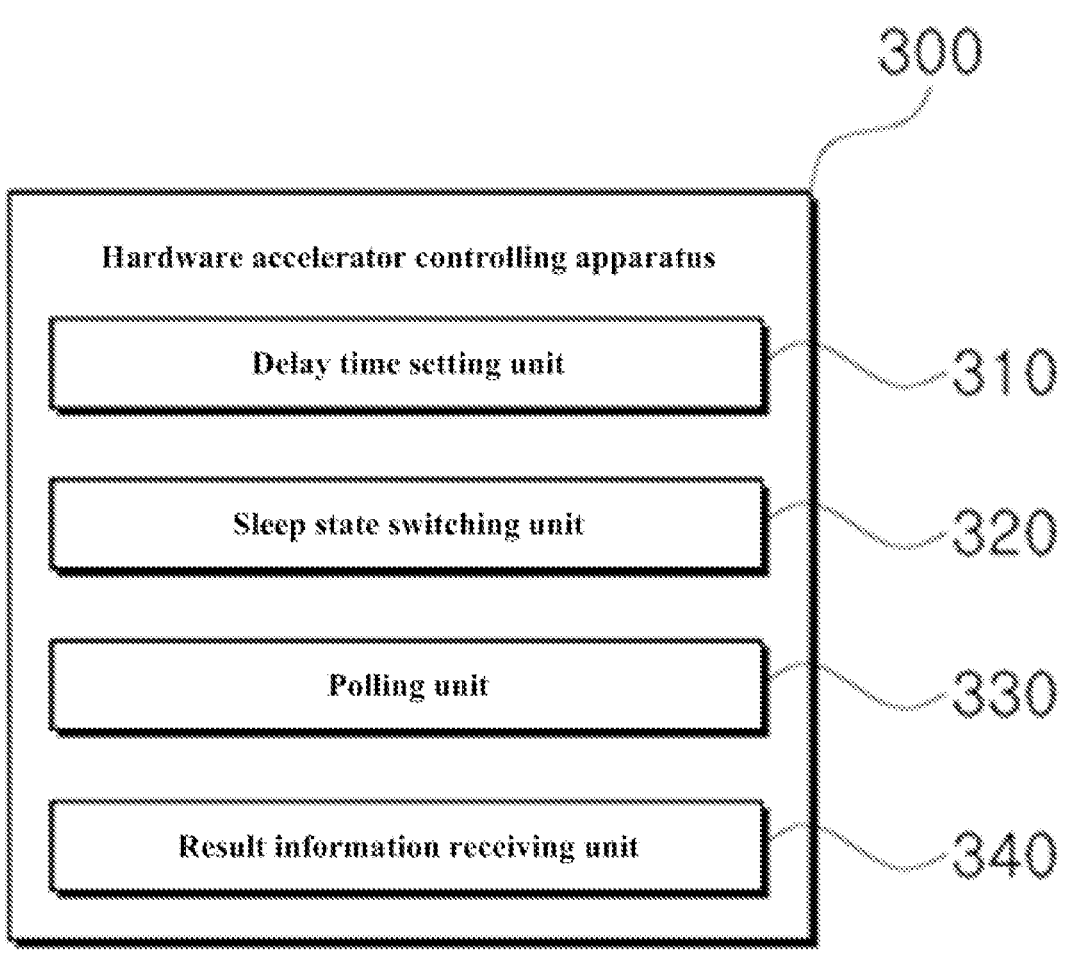
FIG. 3 is a schematic diagram showing a hardware accelerator controlling apparatus, according to an embodiment of the inventive concept.

FIG. 3 is a schematic diagram showing a hardware accelerator controlling apparatus, according to an embodiment of the inventive concept.

As illustrated in FIG. 3, a hardware accelerator controlling apparatus 300 may include a delay time setting unit 310, a sleep state switching unit 320, a polling unit 330, and a result information receiving unit 340.

More specifically, the delay time setting unit 310 may set a delay time related to task performance of a specific hardware accelerator.

When requesting, from a CPU, requesting a specific hardware accelerator to accelerate a task, the sleep state switching unit 320 may switch to a sleep state during the set delay time from the request time point.

The polling unit 330 may switch from the sleep state to an operating state after the delay time and may perform polling a state of the specific hardware accelerator to the CPU.

The result information receiving unit 340 may receive result information corresponding to the polling from the CPU in response to the polling described above.

As described above, the hardware accelerator controlling apparatus 300 may receive a setting initialization request message of the specific hardware accelerator from the specific system job. In this case, the setting initialization request message may be used to request automatic setting of a delay time related to a specific hardware accelerator, or may be used to request manual setting of delay time related to the specific hardware accelerator. Accordingly, hereinafter, a specific embodiment for a setting initialization operation will be described in detail with reference to FIGS. 4 and 5.

Figure 4:
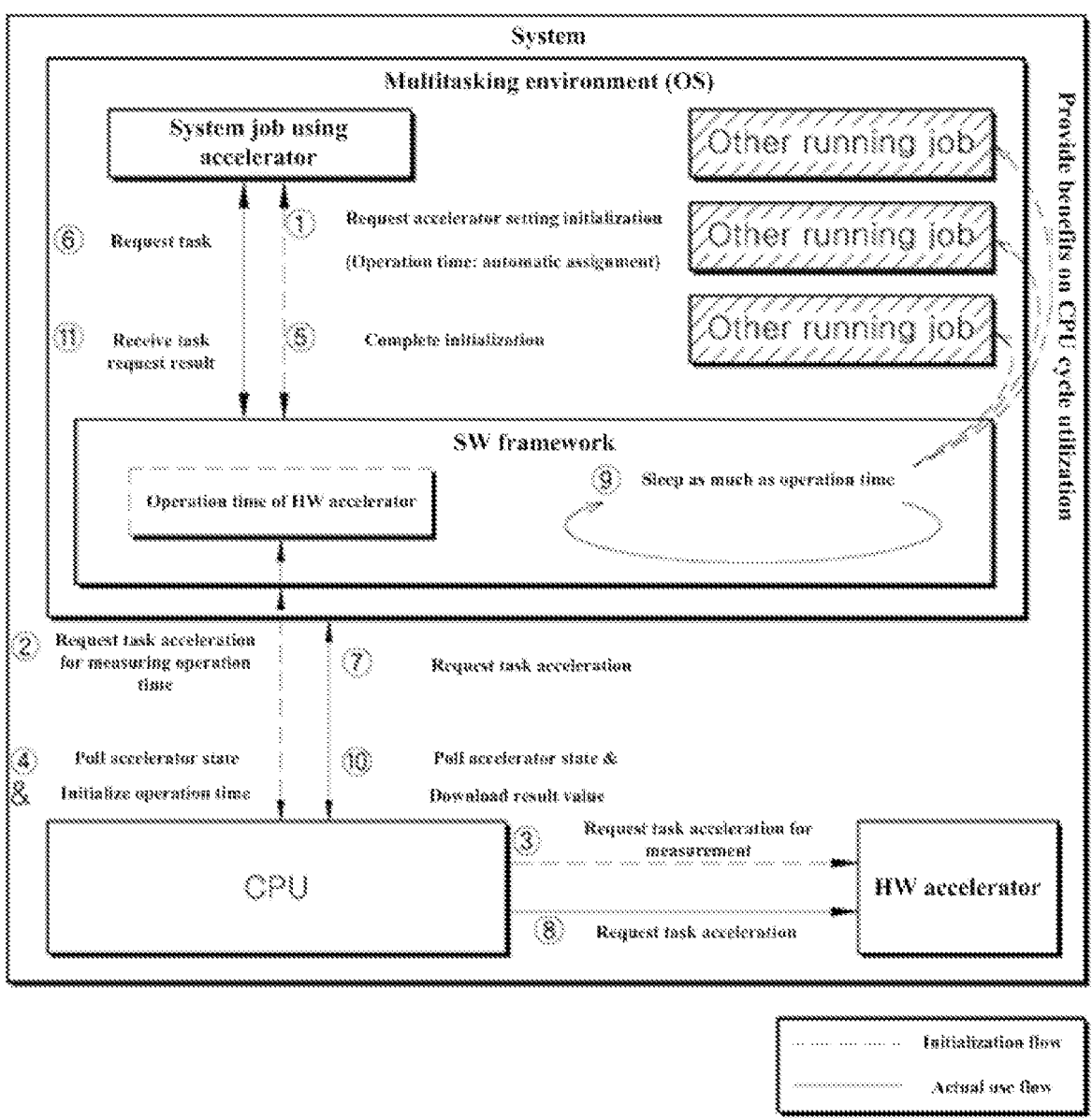
FIG. 4 is a diagram illustrating an operation example of requesting an automatic setting of a delay time during setting initialization, according to an embodiment of the inventive concept.
Figure 5:
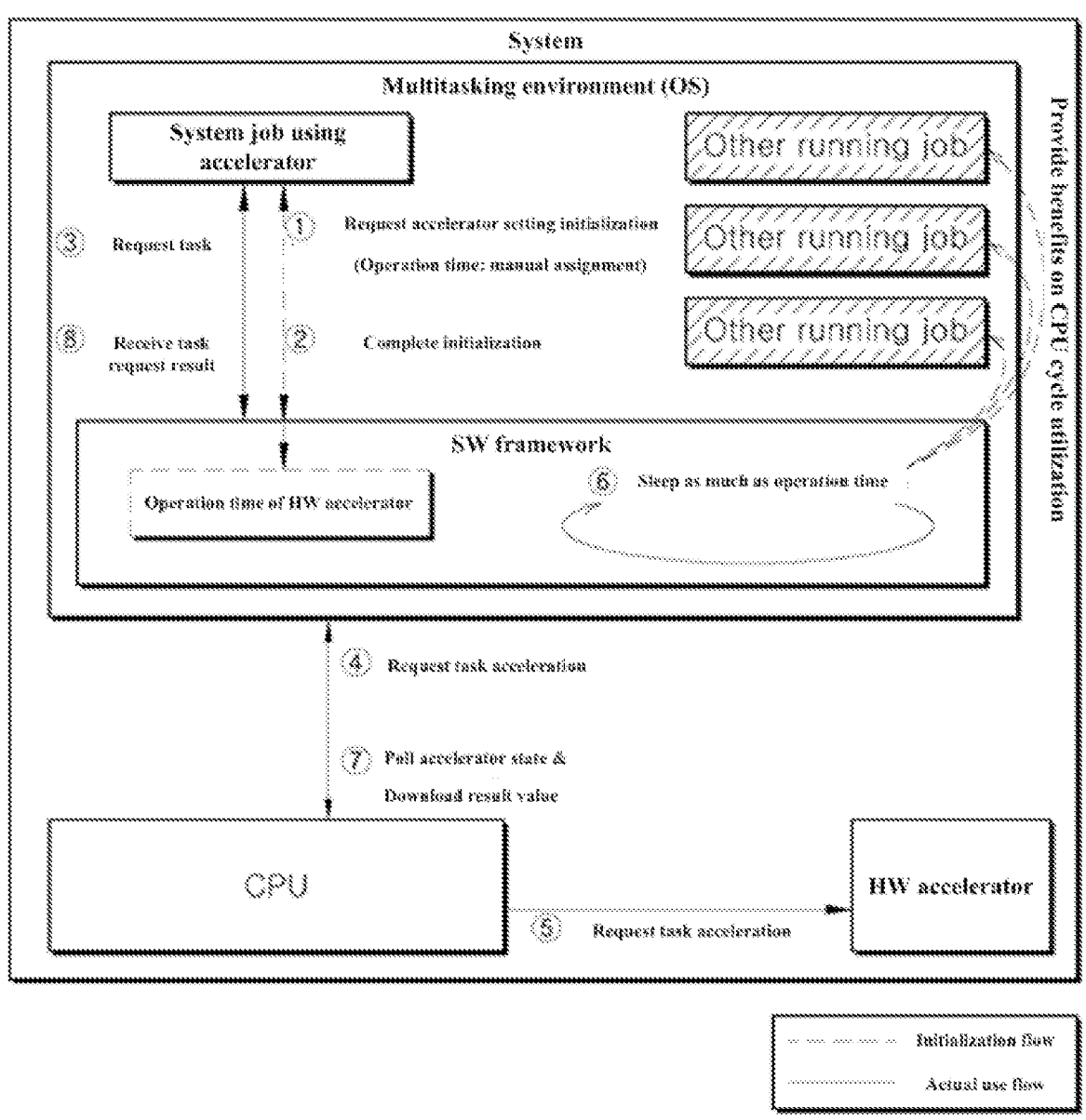
FIG. 5 is a diagram illustrating an operation example of requesting a manual setting of a delay time during setting initialization, according to another embodiment of the inventive concept.

FIG. 4 is a diagram illustrating an operation example of requesting an automatic setting of a delay time during setting initialization, according to an embodiment of the inventive concept. FIG. 5 is a diagram illustrating an operation example of requesting a manual setting of a delay time during setting initialization, according to another embodiment of the inventive concept.

As illustrated in FIGS. 4 and 5, the entire system may include a multitasking environment (e.g., OS), CPU, and a hardware accelerator (HW accelerator). In this case, the multitasking environment may include a specific system job (e.g., a system job using the HW accelerator of FIGS. 4 and 5), other running jobs, and a software framework (SW framework). In the example, the hardware accelerator controlling apparatus according to an embodiment of the inventive concept may correspond to the software framework.

As described above, the hardware accelerator controlling apparatus 300 may set a hardware accelerator. In this case, the hardware accelerator controlling apparatus 300 may receive a setting initialization request message of the specific hardware accelerator from the specific system job through the delay time setting unit 310.

In an embodiment of the inventive concept, the setting initialization request message may be used to request automatic setting of a delay time (or an operation time, hereinafter collectively referred to as a "delay time") related to a specific hardware accelerator (e.g., FIG. 4), or may be used to request manual setting of delay time related to the specific hardware accelerator (e.g., FIG. 5).

For example, as illustrated in FIG. 4, when the setting initialization request message is used to request the automatic setting of the delay time associated with the specific hardware accelerator, the hardware accelerator controlling apparatus 300 according to an embodiment of the inventive concept may make a request, to a (host) CPU, for requesting the specific hardware accelerator to accelerate a task for measuring the delay time through the delay time setting unit 310. Then, after a specific period, the hardware accelerator controlling apparatus 300 may poll a state of the specific hardware accelerator to the CPU and may receive result information for measurement through the delay time setting unit 310 in response to the polling. To this end, the CPU may request the acceleration of a task for measuring a delay time with a HW accelerator.

In this way, the hardware accelerator controlling apparatus 300 may determine the delay time associated with the task performance of the specific hardware accelerator by using the received result information for measurement through the delay time setting unit 310. Next, the hardware accelerator controlling apparatus 300 may set the determined delay time as a delay time associated with the task performance of the specific hardware accelerator through the delay time setting unit 310.

For another example, as illustrated in FIG. 5, when the setting initialization request message is used to request the manual setting of the delay time associated with the specific hardware accelerator, the hardware accelerator controlling apparatus 300 according to an embodiment of the inventive concept may determine the delay time associated with the task performance of the specific hardware accelerator through the delay time setting unit 310 For example, the hardware accelerator controlling apparatus may determine the delay time associated with the task performance of a specific hardware accelerator by using at least one or more of input information input from a user or minimum delay time information set for the hardware accelerator.

When settings for the specific hardware accelerator are initialized through the above-described process, the hardware accelerator controlling apparatus 300 according to an embodiment of the inventive concept may provide a setting initialization completion message of the specific hardware accelerator to a system job that has transmitted a setting initialization request through the delay time setting unit 310.

Next, the hardware accelerator controlling apparatus 300 may receive a task request from the above-described system job. When the task request is received, the hardware accelerator controlling apparatus 300 may a make a request, to the (host) CPU, for requesting the specific hardware accelerator associated with the system job to accelerate a task. In this case, the hardware accelerator controlling apparatus 300 may switch to the sleep state during the set delay time from the request time point through the sleep state switching unit 320. In other words, the hardware accelerator controlling apparatus 300 may minimize an unnecessary polling operation during the delay time by switching to the sleep state during the set delay time through the sleep state switching unit 320.

The hardware accelerator controlling apparatus 300 may poll the state of the specific hardware accelerator to the CPU by switching from the sleep state to an operating state after the above-described delay time through the polling unit 330. In response, the CPU may request the specific hardware accelerator to accelerate a task. Next, the hardware accelerator controlling apparatus 300 may receive result information corresponding to the polling from the CPU in response to the polling through the result information receiving unit 340.

In the examples of the inventive concept described above, the specific hardware accelerator may include a graphic processing unit (GPU). Moreover, the task performance of the specific hardware accelerator may include implementation of a deep learning algorithm.

Accordingly, the hardware accelerator controlling apparatus according to an embodiment of the inventive concept may minimize an unnecessary polling operation and may control the hardware accelerator for a deep learning algorithm.

In an embodiment, the deep learning algorithm applicable to the inventive concept will be described.

The deep learning algorithm is one of machine learning algorithms and refers to a modeling technique developed from an artificial neural network (ANN) created by mimicking a human neural network. The ANN may be configured in a multi-layered structure as shown in FIG. 6.

Figure 6:
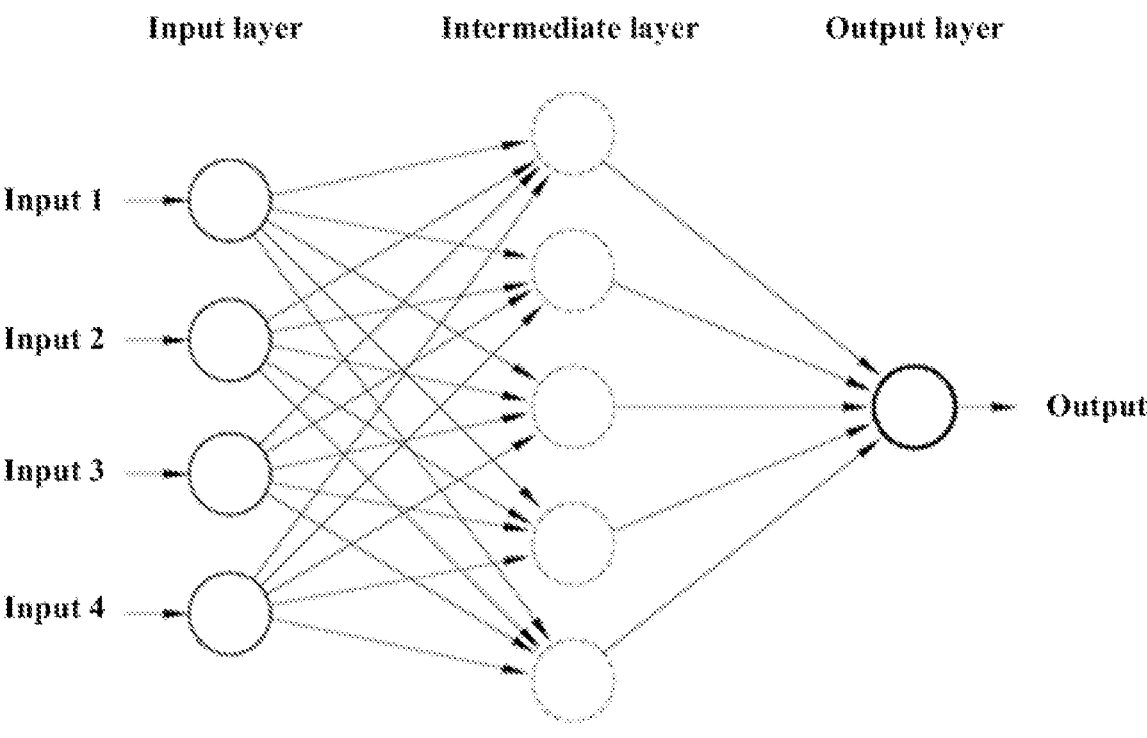
FIG. 6 is a diagram briefly illustrating a basic concept of an ANN.

FIG. 6 is a diagram briefly illustrating a basic concept of an ANN.

As shown in FIG. 6, the ANN may have a hierarchical structure including an input layer, an output layer, and at least one or more intermediate layers (or hidden layers) between the input layer and the output layer. On the basis of a multi-layered structure, the deep learning algorithm may derive highly reliable results through learning to optimize a weight of an interlayer activation function.

The deep learning algorithm applicable to the inventive concept may include a deep neural network (DNN), a convolutional neural network (CNN), a recurrent neural network (RNN), and the like.

The DNN basically improves learning results by increasing the number of intermediate layers (or hidden layers) in a conventional ANN model. For example, the DNN performs a learning process by using two or more intermediate layers. Accordingly, a computer may derive an optimal output value by repeating a process of generating a classification label by itself, distorting space, and classifying data.

Unlike a technique of performing a learning process by extracting knowledge from existing data, the CNN has a structure in which features of data are extracted and patterns of the features are identified. The CNN may be performed through a convolution process and a pooling process. In other words, the CNN may include an algorithm complexly composed of a convolution layer and a pooling layer. Here, a process of extracting features of data (called a "convolution process") is performed in the convolution layer. The convolution process may be a process of examining adjacent components of each component in the data, identifying features, and deriving the identified features into one sheet, thereby effectively reducing the number of parameters as one compression process. A process of reducing the size of a layer from performing the convolution process (called a "pooling process") is performed in a pooling layer. The pooling process may reduce the size of data, may cancel noise, and may provide consistent features in a fine portion. For example, the CNN may be used in various fields such as information extraction, sentence classification, and face recognition.

The RNN has a circular structure therein as a type of ANN specialized in learning repetitive and sequential data. The RNN has a feature that enables a link between present learning and past learning and depends on time, by applying a weight to past learning content by using the circular structure to reflect the applied result to present learning. The RNN may be an algorithm that solves the limitations in learning conventional continuous, repetitive, and sequential data, and may be used to identify speech waveforms or to identify components before and after a text.

However, these are only examples of specific deep learning techniques applicable to the inventive concept, and other deep learning techniques may be applied to the inventive concept according to an embodiment.

Additionally, a computer program according to an embodiment of the inventive concept may be stored in a computer-readable recording medium to execute various hardware accelerator controlling methods described above while being combined with a computer.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The steps of a method or algorithm described in connection with the embodiments of the inventive concept may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form known in the art to which the inventive concept pertains.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

According to an embodiment of the inventive concept, unnecessary cycle consumption of a host CPU for a time-critical polling-type hardware accelerator may be minimized.

In particular, according to an embodiment of the inventive concept, unnecessary consumption of CPU cycles may be minimized by minimizing unnecessary polling operations. Accordingly, the performance of the entire system may be improved.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A hardware accelerator controlling method, the method comprising:
   setting a delay time related to task performance of a specific hardware accelerator;
   when making a request, to a central processing unit (CPU), for requesting the specific hardware accelerator to accelerate a task, switching to a sleep state during the set delay time from a request time point;
   when switching to the sleep state, not polling a state of the specific hardware accelerator to the CPU during the delay time;
   polling the state of the specific hardware accelerator to the CPU by switching from the sleep state to an operating state after the delay time; and
   receiving result information corresponding to the polling from the CPU in response to the polling,
   wherein the setting of the delay time includes:
   receiving a setting initialization request of the specific hardware accelerator from a system job using the specific hardware accelerator,
   wherein, when the setting initialization request of the specific hardware accelerator is used to request an automatic setting of the delay time, the setting of the delay time further includes:

making a request, to the CPU, requesting the specific hardware accelerator to accelerate a task for measuring the delay time; and
after a specific period, polling the state of the specific hardware accelerator to the CPU and receiving result information for measurement in response to the polling,
wherein the delay time associated with the task performance of the specific hardware accelerator is determined by using the received result information for measurement.

2. The method of claim 1, wherein the setting of the delay time further includes:
   determining the delay time related to the task performance of the specific hardware accelerator in response to the setting initialization request; and
   providing the system job with a setting initialization completion message of the specific hardware accelerator.

3. The method of claim 2, wherein, when the setting initialization request of the specific hardware accelerator is used to request a manual setting of the delay time, the delay time associated with the task performance of a specific hardware accelerator is determined by using at least one of input information input from a user or minimum delay time information set for the hardware accelerator.

4. The method of claim 1, wherein the specific hardware accelerator includes a graphic processing unit (GPU), and
   wherein the task performance of the specific hardware accelerator includes implementation of a deep learning algorithm.

5. A hardware accelerator controlling apparatus, the apparatus comprising:
   at least one processor; and
   a memory coupled to the at least one processor and configured to store executable instructions that, when executed by the at least one processor, instruct the at least one processor to:
   set, by a delay time setting unit, a delay time related to task performance of a specific hardware accelerator;
   switch, by a sleep state switching unit, to a sleep state during the set delay time from a request time point when making a request, to a central processing unit (CPU), for requesting the specific hardware accelerator to accelerate a task;
   not to poll, by a polling unit, a state of the specific hardware accelerator to the CPU during the delay time when switching to the sleep state, and to poll the state of the specific hardware accelerator to the CPU by switching from the sleep state to an operating state after the delay time; and
   receive, by a result information receiving unit, result information corresponding to the polling from the CPU in response to the polling,
   wherein the delay time setting unit is executed by the at least one processor to:
   receive a setting initialization request of the specific hardware accelerator from a system job using the specific hardware accelerator;
   when the setting initialization request of the specific hardware accelerator is used to request an automatic setting of the delay time, the delay time setting unit is executed by the at least one processor to:
   make a request, to the CPU, requesting the specific hardware accelerator to accelerate a task for measuring the delay time; and after a specific period, poll the state of the specific hardware accelerator to the CPU and receive result information for measurement in response to the polling, wherein the delay time associated with the task performance of the specific hardware accelerator is determined by using the received result information for measurement.

6. The apparatus of claim 5, wherein the delay time setting unit is executed by the at least one processor:

determine the delay time related to the task performance of the specific hardware accelerator in response to the setting initialization request; and provide the system job with a setting initialization completion message of the specific hardware accelerator.

7. The apparatus of claim 6, wherein, when the setting initialization request of the specific hardware accelerator is used to request a manual setting of the delay time, the delay time associated with the task performance of a specific hardware accelerator is determined by using at least one of input information input from a user or minimum delay time information set for the hardware accelerator.

8. The apparatus of claim 5, wherein the specific hardware accelerator includes a graphic processing unit (GPU), and wherein the task performance of the specific hardware accelerator includes implementation of a deep learning algorithm.

* * * * *